United States Patent [19]

Rivlin

[11] Patent Number: 6,032,159
[45] Date of Patent: Feb. 29, 2000

[54] APPARATUS AND METHOD FOR ANNOTATED BULK COPYING FILES TO A DATABASE

[75] Inventor: Alex E. Rivlin, San Jose, Calif.

[73] Assignee: Altera Corporation, San Jose, Calif.

[21] Appl. No.: 08/918,522

[22] Filed: Aug. 21, 1997

Related U.S. Application Data

[60] Provisional application No. 60/031,790, Nov. 27, 1996.

[51] Int. Cl.$^7$ .................................................. G06F 17/30
[52] U.S. Cl. .............................. 707/204; 707/203; 707/1; 709/200
[58] Field of Search ................................ 707/200, 202, 707/204, 203, 1; 709/200

[56] References Cited

U.S. PATENT DOCUMENTS

| | | | |
|---|---|---|---|
| 4,106,092 | 8/1978 | Millers, II | 364/200 |
| 4,935,869 | 6/1990 | Yamamato | 364/200 |
| 5,404,508 | 4/1995 | Konrad et al. | 707/200 |
| 5,657,447 | 8/1997 | Leung et al. | 707/1 |
| 5,706,494 | 1/1998 | Cochrane et al. | 707/2 |
| 5,734,918 | 3/1998 | Odawara et al. | 395/800.01 |
| 5,751,719 | 5/1998 | Chen et al. | 370/473 |
| 5,832,524 | 11/1998 | Jarvenpada | 707/204 |

OTHER PUBLICATIONS

"Open Client—DB Library/C Reference Manual", http://sybootes.sybase.com/cgi–bin/nph–dynaweb/cng1000e/dblib/4856, Reference Date Unknown.

*Primary Examiner*—Thomas G. Black
*Assistant Examiner*—Frantz Coby
*Attorney, Agent, or Firm*—William S. Galliani; Pennie & Edmonds LLP

[57] ABSTRACT

A method of copying files to a database includes the step of constructing a table of file attributes characterizing each file of a set of files stored on a computer. A specific file from the set of files is then identified. A file selected field corresponding to the specific file is then marked within the table. The specific file is then transferred to a database where it is recorded without acknowledgment. A file transfer status field for the specific file is then updated.

20 Claims, 3 Drawing Sheets

APPARATUS AND METHOD FOR ANNOTATED BULK COPYING FILES TO A DATABASE

This application claims priority to the provisional application entitled "Apparatus and Method for Annotated Bulk Copying of Files to a Database", Ser. No. 60/031,790, filed Nov. 27, 1996.

BRIEF DESCRIPTION OF THE INVENTION

This invention relates generally to transferring data into databases. More particularly, this invention relates to a technique of recoverable bulk copying of files to a database.

BACKGROUND OF THE INVENTION

FIG. 1 illustrates a computer (also called a file server) 20. The present invention is applicable to any computer which transfers data to a database, however, the invention will be described in reference to a computer which receives data from electronic test equipment 22. The data from the electronic test equipment is stored as a set of test data files 24. The test data files describe diagnostic information relating to the testing of a semiconductor wafer. Typical information in a test data file includes the electronic test equipment name, the wafer name, the die name, the date, the time, and a set of test parameters for the die.

FIG. 1 also illustrates an operating system 26 and application program 28 operating on the computer 20. FIG. 1 also illustrates a database program 30, which may be operated on the computer 20 or a separate computer. In the prior art, there are at least two ways to transfer test data files 24 or data from the operating system 26 or application program 28 to a database program 30. One technique is a standard insertion operation. For example, the "Open Client-DB Library/C" product sold by SYBASE, Incorporated, Emeryville, Calif., supports an "insert" command. The insert command results in data being inserted into the database 30 in multiple locations. For example, the data is stored to a data device, to a data device mirror, to a log device, and to a log device mirror. After each item is inserted, an acknowledgment is sent to the system from which the data arrived. This approach provides recoverable and consistent data in the case of a system failure, such as a power failure, a database crash, or disk failure. The problem with this approach is that it is relatively slow. The speed problem is largely attributable to the acknowledgment operation that is executed after each item is inserted into the database. In many cases the insertion and acknowledgment operations at the different database locations are performed sequentially, further slowing the process. The speed problem is especially acute in the case of test data files from electronic test equipment 22 because such files have large amounts of data.

Another approach to transferring data to a database is known as bulk copying. For example, the "Open Client-DB Library/C" product sold by SYBASE, Incorporated, Emeryville, Calif., supports a bulk copy "bcp" command. The main advantage of the bulk copy command over the insert command is speed. The high speed is achieved because acknowledgment signals are not sent for each item that is entered into the database. In addition, the transferred information is not redundantly written to a data log during the transfer. In view of these circumstances, it is problematic if the system fails before the bulk transfer is complete. In particular, since there is no acknowledgment operation, it is impossible to determine which information was transferred before the system failure. Thus, it is unknown which information is already in the database and which information still has to be transferred to the database. Because high-speed bulk transfers affect the recoverability of the database, database vendors discourage the use of bulk transfers in real time production systems, such as test data files 24 from electronic test equipment 22.

In view of the foregoing, it would be highly desirable to provide a technique for obtaining the speed benefits of bulk transfers to a database, while preserving file transfer status information in the case of a system failure.

SUMMARY OF THE INVENTION

A method of copying files to a database includes the step of constructing a table of file attributes characterizing each file of a set of files stored on a computer. A specific file from the set of files is then identified. A file selected field corresponding to the specific file is then marked within the table. The specific file is then transferred to a database where it is recorded without sending an acknowledgment. A file transfer status field for the specific file is then updated. The method of the invention provides for fast bulk copying of files to a database. The described table provides annotation for the bulk copying operation. Thus, in the case of a database system failure, the exact file transfer status of the bulk copying operation can be determined. While prior art systems allow multiple records to be inserted and extracted from a database, those transactions cannot be performed in an annotated bulk copying operation, as provided with the present invention.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
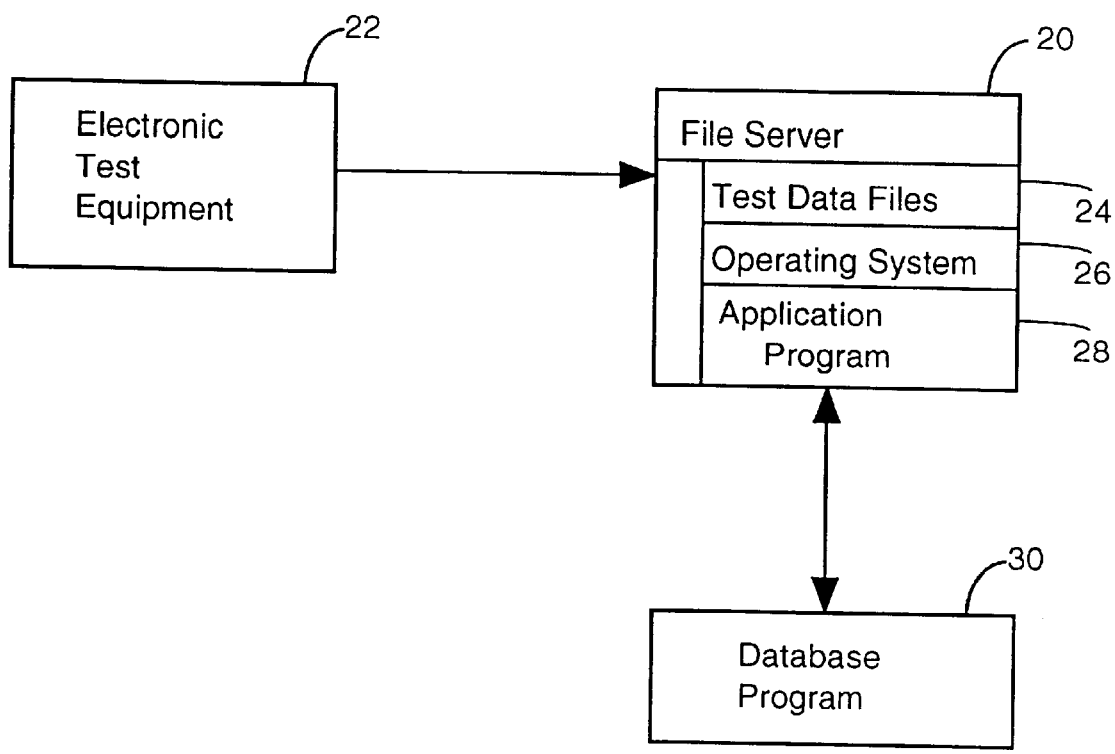
FIG. 1 illustrates a computer system including a database program for bulk copying of files.
Figure 2:
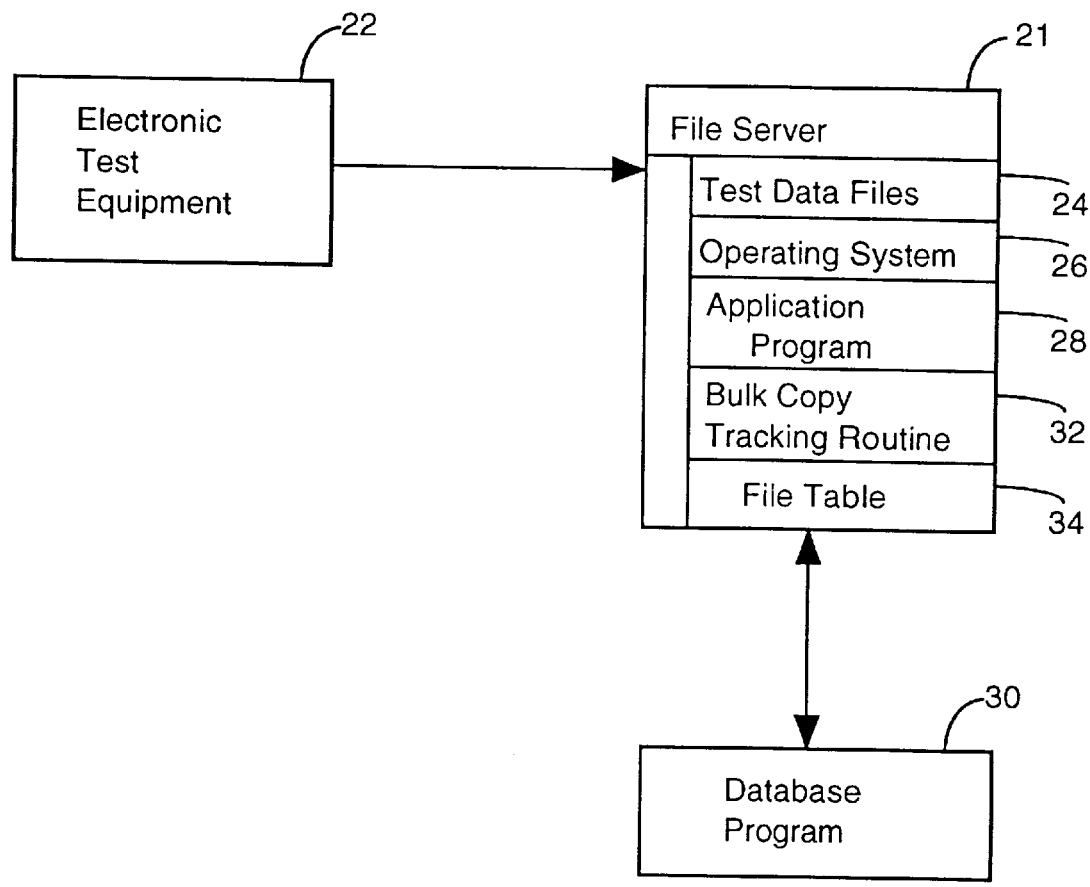
FIG. 2 illustrates a computer system including a file server with a bulk copy tracking routine to supervise the bulk copying of files to a database.

FIG. 2 illustrates a computer 21 operated in accordance with an embodiment of the invention. The computer 21 executes annotated bulk file transfers to a database. The transferred files may be from any source, but the invention is described in reference to files generated in a production environment. In particular, electronic test equipment 22 is used to generate test data files 24. As in the case of the system of FIG. 1, each test data file may include the electronic test equipment name, the wafer name, the die name, the date, the time, and a set of test parameters for the die.

FIG. 2 also illustrates an operating system 26 and application program 28 operating on the computer 21. In addition, the figure illustrates a database program 30, which may be on the computer 21 or a separate computer. The elements described up to this point are consistent with the prior art elements described in reference to FIG. 1. The computer 21 of the present invention is modified to include a bulk copy tracking routine 32, which generates a file table 34.

In short, the bulk copy tracking routine 32 allows for annotated bulk copying operations to be performed. The annotation operation provides recoverability information in the case of a system failure, while the bulk copying operation provides for rapid file transfer sequences.

Figure 3:
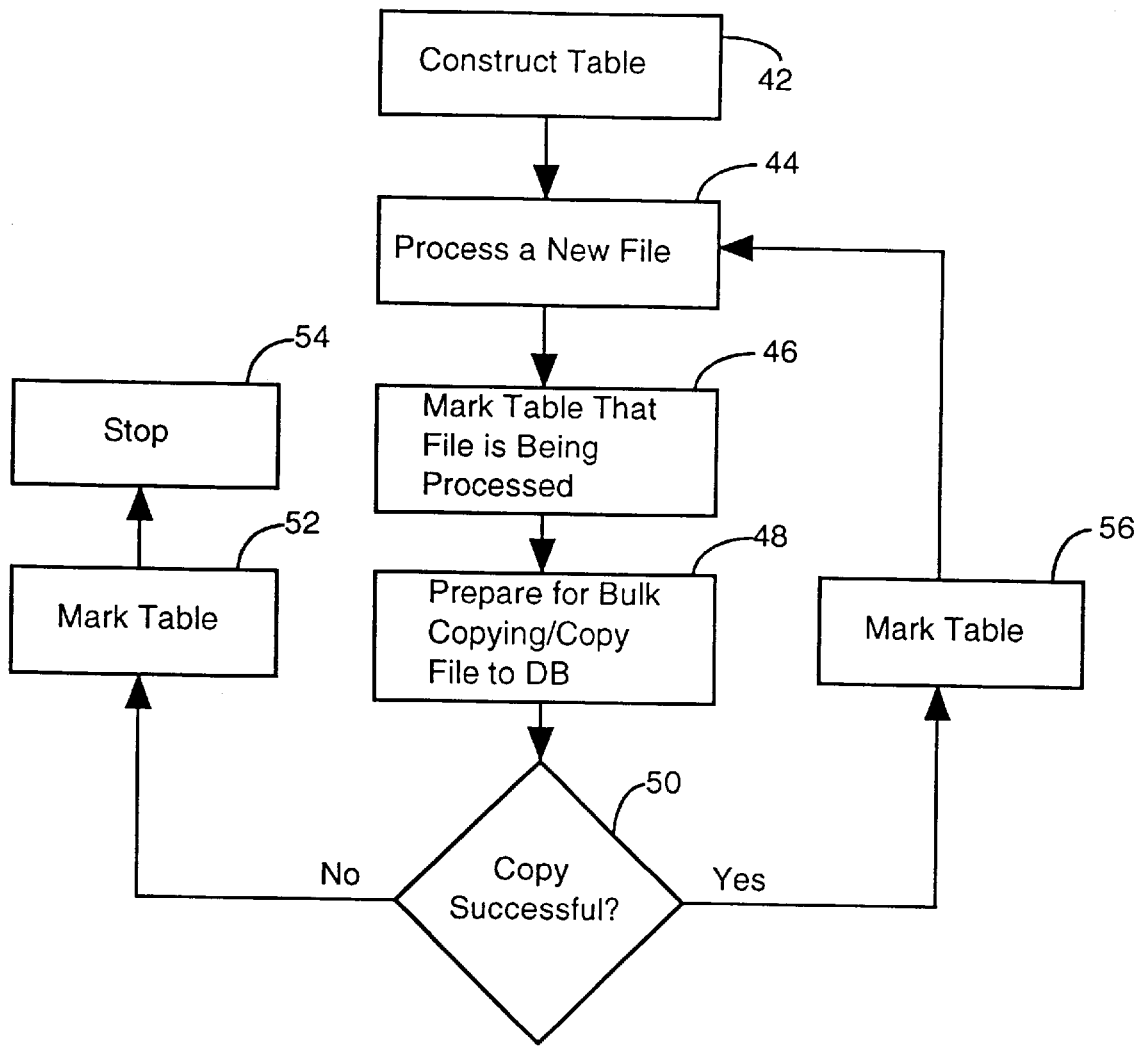
FIG. 3 illustrates processing steps associated with a bulk copy tracking routine in accordance with an embodiment of the invention.

Processing steps associated with the bulk copy tracking routine 32 are illustrated in FIG. 3. The first processing step illustrated in FIG. 3 is to construct a file attribute table (step 42). The file attribute table describes each file and a set of predetermined attributes associated with each file. Table I below is an example of a file attribute table which may be used in accordance with the invention.

TABLE 1

| File Name | File Selected | Transfer Status | Attribute_1 | Attribute_N |
|---|---|---|---|---|
| 123 | 1 | 1 | XYX | ABC |
| 456 | 1 | 0 | UVW | DEF |
| 789 | 0 | 0 | RST | GHI |

The example attribute table includes a field for the file name, a field to indicate whether the file has been selected, a transfer status field, and a set of attribute fields (Attribute_1 to Attribute_N). Attribute fields may include such attributes as the date and time the file was created.

The next step shown in FIG. 3 is to process a new file (step 44). That is, a single file from the set of received files is selected for processing. The table is then marked to indicate that the specific file is being processed (step 46). Referring to the example of Table I, the first column of the first row specifies a file "123". The next column of the first row is a "file selected" field. By way of example, a digital one "1" is used to indicate that the file has been selected and a digital zero "0" is used to indicate that the file has not been selected.

The next processing step shown in FIG. 3 is to copy the file to the database (step 48). As discussed below, this operation entails loading data from the test data files 24 in an array, and then bulk copying the array to the database 30.

The next processing step shown in FIG. 3 is a determination whether the copy was successful (step 50). This decision is made with error messages associated with the copy operation, as discussed below. In the case of an unsuccessful copy operation, the table is marked accordingly (step 52). In the example table shown above, file 456 has been selected (as indicated by a digital one "1" in the file selected field), but the transfer has not been successful (as indicated by the digital zero "0" in the transfer status field). Since the transfer is not acceptable, the bulk copying operation is terminated (step 54). At this point, the table can be used to determine what has been copied to the database and what has not been copied to the database. Again relying upon the example of Table I above, file "123" has been successfully transferred, file "456" has been selected, but not transferred, and file "789" has not been selected or transferred. File transfer status codes indicative of a variety of file transfer results may be used, as discussed below.

If the copy operation is successful, then the bulk copy tracking routine 32 marks the table accordingly (step 56). As indicated above, Table I shows that file "123" has been successfully copied. Thereafter, a new file is selected for processing (step 44) and processing continues.

Observe that with the present invention, a file is treated as a unit. If one byte of the file is not successfully transferred, the entire file is considered as not being transferred to the database. While the prior art allows a grouping of records (arguably a "file") to be inserted or extracted from a database, this operation is performed by treating each entry of the grouping as an individual element. That is, for a standard copying operation, if the final element of a group of records is not successfully transferred, the remaining elements associated with the group will still have been transferred into the database and an acknowledgment will have been sent for the entered elements. However, in the case of a bulk copy operation, the database will not generate an acknowledgment as individual elements of the file are loaded into the database. In the case of a bulk copying failure, there is no way to determine what portion of the file is in the database. That is, the prior art bulk copy operation is not annotated, thus, in the case of a system failure there is no reliable method for determining what information has been transferred to the database. With the present invention, when a file transfer fails, all records associated with the unsuccessfully transferred file may be deleted from the database.

Although the invention has been fully described, attention presently turns to a more detailed description of the operation of an embodiment of the invention so that the invention can be more fully appreciated. The following computer code in the C++ language is an example of a bulk copy tracking routine 32 in accordance with an embodiment of the invention. More particularly, the following computer code is directed toward step 48 of the bulk copy tracking routine 32. Step 48 relates to the operations of preparing for bulk copying and bulk copying to the database. While the following code explicitly describes an embodiment of step 48, it also serves to illustrate the other processing steps associated with the bulk copy tracking routine 32.

Table I above is an example of a file table 34 that may be used in accordance with the invention. After the table is constructed (step 42), and a new file is selected for processing (step 44), and the table is marked to indicate that processing has commenced (step 46), the bulk copying operation (step 48) is performed. The following code shows that the bulk copying operation can be implemented by loading data from a test data file 24 into a data array and then using the bulk copy "bcp" command to load the data array into the database program 30.

The initial block of code establishes a class "ExampleTableData". A new class is created for each set of data that is written to the database program 30. The ExampleTableData class has data members and functions. The data members include a number of integer variables (e.g., iField1, iField2) and character variables (e.g., acField3, dField4). The data members are used to define the columns in the database 30 that will be populated. The code also defines a number of functions, including "ExampleTableData( );" and "Read (long iFileDescriptor)".

```
class ExampleTableData
{
public:
    int         iField1;
    int         iField2;
```

```
            char[128]       acField3;
            double          dField4;
            char[64]        acField5;
            ExampleTableData( );
            ~ExampleTableData( );
            int Read (long iFileDescriptor);
            ...
          }
```

The following code refers to DBPROCESS, which is a class forming a portion of the "Open Client-DB Library/C" product sold by SYBASE, Incorporated, Emeryville, Calif. DBPROCESS is declared and initialized externally. The term "dproc" is a variable name. The term "*pExampleTableRow" is a pointer into the ExampleTableData described above. The "GetNumberofRows( )" method returns an integer value specifying the number of rows in a table. The code also shows the "iRowsRead" variable being set to zero. The code also refers to an unsigned character "cTag", which is a character string describing the contents of a portion of the test data file 24. The remaining declared variables in this program segment are used to implement the bulk copy "bcp" command. These variables are used because an array from the test data file 24 cannot be bound to a table of the database program 30. Instead, selected variables of an array must be bound to corresponding fields of a table in the database program.

```
extern DBPROCESS dbproc;
int StuffTable ( )
{
ExampleTableData *pExampleTableRow;
int                 iNumberOfRows = GetNumberOfRows ( );
int                 iRowsRead = 0;
unsigned char       cTag;
int                 iField1;
int                 iField2;
char[128]           acField3;
double              dField4;
char[64]            acField5;
```

The following "if" statement is used to allocate memory. If memory is not available, then NULL is true and an error message is written to the table using the "ExitAndMarkstatusTable( )" method. The "ExitAndMarkstatusTable( )" method can be viewed as a method to implement step 52 of FIG. 3. In this case, steps 42–48 of FIG. 3 are performed, but the file transfer is unsuccessful, so the table, e.g., Table I above is marked (step 52) and processing stops (step 54). File "456" of Table I is an example of this processing.

The "while" loop in the following code reads the "cTag" and the number of bytes ("sizeof") associated with the "cTag". Depending upon the identity of the "cTag" character string, a selected set of code is executed. By way of example, the following code shows "EXAMPLE_TABLE_DATA" as the "cTag" and a set of operations associated with this variable. The operations include reading an "iFileDescriptor" and incrementing the "iRowsRead" variable. The reading of the "iFileDescriptor" operates to load data into the ExampleTableRow so that this data can be subsequently transferred by the bulk copying operation. All rows are read in this manner until the end of file ("EOF") character is read, in which case the loop is exited. At this point, all rows of the test data file 24 have been read. The number of rows is associated with the variable "iRowsRead".

```
if( ( pExampleTableRow = new ExampleTableData [ iNumberOfRows ])
== NULL )
{
ExitAndMarkstatusTable ( );
}
while ( 1 )
{
read ( iFileDescriptor, &cTag, sizeof( unsigned char ) );
switch ( cTag )
{
...
case EXAMPLE_TABLE_DATA:
{
pExampleTableRow [ iRowsRead ] . Read ( iFileDescriptor );
iRowsRead ++;
}
...
case EOF:
break;
}
}
```

As indicated above, at this processing point it is known how many rows will have to be written to "ExampleTable". The "dbfreebuf(dbproc)" statement is used to initialize the bulk copy "bcp" command. The first "if" command performs an initialization operation. If the operation fails, an error message field of the file table 34 (Table I above) is marked to indicate "Can not do bcp_int". The second "if" clause is used to bind all local variables to corresponding column names in the database 30 that will be written to. This is done by writing the variable "iField1" to "dbproc", which allows the bulk copy "bcp" command to write the information to the database program 30. If this operation cannot be performed, an error message field of the file table 34 is marked to indicate "Can not bind TABLE_NAME (Field1)".

```
...
// Initialize BCP
dbfreebuf( dbproc );
if( bcp_init ( dbproc,
"DB_NAME..TABLE_NAME", NULL, NULL, DB_TN )
==FAIL )
ExitAndMarkstatusTable ( "Can not do bcp_init[ );
if( bcp_bind( dbproc,
( unsigned char * )&iField1,
0,
–1,
NULL,
0,
SYBINT2,
1) ==FAIL )
ExitAndMarkstatusTable ( "Can not bind TABLE_NAME ( Field1 )" );
```

The following code is used to send data to the database program 30. The "for" loop circulates until the "iRowsRead" integer value is reached. The first statement in the "for" loop is to assign previously bound variables to fields in a row of a database table. The first "if" clause in the "for" loop is used to send an array row to the database program 30 using the bulk copy "bcp" command. If the operation fails, an error message field of the file table 34 is marked "Can not send row to TABLE1". The subsequent program statement actually writes the data to the database program 30 and returns an integer number "i" indicating the number of rows successfully written. If the correct number of rows was written, as checked with the "if (i!=iRowsRead)" statement, then processing continues. Otherwise, the file table 34 is marked to indicate "BCP to TABLE1 failed". Processing continues until all rows have been processed. If all rows are successfully processed, then the "return SUCCESS" command is executed. This operation calls a method to mark the file table 34 to indicate that the transfer was successful. This operation can be viewed as step 56 of FIG. 3. At this point, a new file in the table 34 is selected (step 44) and processing continues in the manner previously described.

```
for ( int = 0; i < iRowsRead, i++ )
{
iField1 = pExampleTableRow[i].iField1
if( bcp#sendrow( dbproc ) -=FAIL)
{
ExitAndMarkstatusTable ( "Can not send row to TABLE1");
}
}
i = (int) bcp done ( dbproc );
if( i!=iRowsRead )
{
ExitAndMarkstatusTable ( "BCP to TABLE1 failed" );
}
return SUCCESS;
}
```

The file table 34 may be implemented in any number of ways. By way of example, the file table has been implemented with the following fields: TesterName (i.e., tester 22), ProductName (i.e., the product being tested), LotName (i.e., the product lot being tested), BeginProgramTime (i.e., the time the test equipment 22 began to execute the testing run), LDBFileSize (i.e., the size of the test data file), EndProgramTime, BashfulName (i.e., the file name associated with the run), PCT22NETTime (i.e., the time that data was transferred from the test equipment 22 to the file server 21), PEDBTransferTime (i.e., the start time of transfer from file server 21 to database 30), StufferSuccessCode (e.g., file transfer status, such as 0=file not seen, 1=transfer started, 2=transfer successful, 3=transfer failed, 4=corrupted file, etc.), StufferDetailCode (i.e., variables characterizing corrupted files), DetailText (i.e., a detailed error message), AlteraLotStepDoneSeqNum (i.e., a pointer to a row in the table), and LastStuffTime (i.e., the time the last file was stuffed). Many of these fields are loaded by the previously described "ExitAndMarkStatusTable" and "SUCCESS" methods.

In sum, the bulk copy tracking routine 32 of the invention operates on top of a standard bulk copying protocol. In particular, it generates a table to record file transfer status information. The table can then be used in the case of a database failure or other event which prevents the completion of a bulk copying operation. In such an event, it is possible to discern what information has been transferred to the database. Prior art bulk copy processes cannot make this determination. The invention exploits the speed advantage of bulk copy operations, while providing recoverable information that is not otherwise available with bulk copy operations.

The foregoing description, for purposes of explanation, used specific nomenclature to provide a thorough understanding of the invention. However, it will be apparent to one skilled in the art that the specific details are not required in order to practice the invention. In other instances, well known computing devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

I claim:

1. A method of copying files to a database, said method comprising the steps of:

constructing a table of file attributes characterizing each file of a set of files stored on a computer;

identifying a specific file from said set of files;

marking within said table a file selected field corresponding to said specific file;

transferring said specific file to a database in response to said marking step;

recording said specific file in said database without acknowledgment; and updating within said table a file transfer status field corresponding to said specific file.

2. The method of claim 1 wherein said table, in addition to including said file selected field and said file transfer status field, includes a plurality of file attribute fields.

3. The method of claim 2 wherein said file transfer status field stores file transfer status codes indicative of the result of said transferring step.

4. The method of claim 2 wherein said table includes a field for error messages.

5. The method of claim 1 wherein each file of said set of files stores test data from electronic test equipment.

6. The method of claim 1 wherein said transferring step includes the steps of:

loading data from said specific file into an array; and bulk copying said array to said database.

7. A method of copying files to a database, said method comprising the steps of:

marking within a table a file selected field corresponding to a selected file;

loading data from said selected file into an array in response to said marking step;

bulk copying said array to a database without acknowledgment from said database; and updating within said table a file transfer status field corresponding to said selected file.

8. The method of claim 7 wherein said table includes a plurality of file attribute fields.

9. The method of claim 7 wherein said table includes a field for error messages.

10. The method of claim 7 wherein said updating step includes the step of updating within said table said file transfer status field with a file transfer status code indicative of the result of said bulk copying step.

11. The method of claim 7 wherein said selected file stores test data from electronic test equipment.

12. A computer readable memory to direct a computer to function in a specified manner, comprising:

first instructions to mark within a table a file selected field corresponding to a selected file;

second instructions to load data from said selected file into an array;

third instructions to bulk copy said array to a database without acknowledgment from said database, said third instructions being in response to the execution of said second instructions; and fourth instructions to update within said table a file transfer status field corresponding to said selected file.

13. The apparatus of claim 12 wherein said table includes a plurality of file attribute fields.

14. The apparatus of claim 12 wherein said table includes a field for error messages.

15. The apparatus of claim 12 wherein said fourth instructions include instructions to update within said table said file transfer status field with a file transfer status code indicative of the result of said bulk copy operation of said third instructions.

16. The apparatus of claim 12 wherein said selected file stores test data from electronic test equipment.

17. A system for copying files to a database, comprising:
a computer constructed to
store a set of files;
mark within a table a file selected field corresponding to a selected file of said set of files;
load data from said selected file into an array;
bulk copy said array to a database without acknowledgment from said database after said file selected field is marked; and
update within said table a file transfer status field corresponding to said selected file.

18. The apparatus of claim 17 wherein said set of files store test data from electronic test equipment.

19. The apparatus of claim 17 wherein said table includes a plurality of file attribute fields.

20. The apparatus of claim 19 wherein said table includes a field for error messages.

* * * * *